United States Patent
Dalle et al.

(10) Patent No.: US 11,080,597 B2
(45) Date of Patent: Aug. 3, 2021

(54) CROWDSOURCED LEARNING ENGINE FOR SEMANTIC ANALYSIS OF WEBPAGES

(71) Applicant: Dashlane, Inc., New York, NY (US)

(72) Inventors: Manuel Dalle, Ivry-sur-Seine (FR); Guillaume Maron, Paris (FR); Frédéric Rivain, Paris (FR); Laure Hugo, Versailles (FR); Kévin Miguet, Paris (FR); Loïc Guychard, Paris (FR); Damien Rajon, Paris (FR)

(73) Assignee: DASHLANE SAS

( * ) Notice: Subject to any disclaimer, the term of this patent is extended or adjusted under 35 U.S.C. 154(b) by 919 days.

(21) Appl. No.: 15/823,883

(22) Filed: Nov. 28, 2017

(65) Prior Publication Data

US 2018/0181866 A1 Jun. 28, 2018

Related U.S. Application Data

(60) Provisional application No. 62/438,008, filed on Dec. 22, 2016.

(51) Int. Cl.
*G06N 3/08* (2006.01)
*G06N 20/00* (2019.01)
*G06N 5/02* (2006.01)
*G06F 40/174* (2020.01)

(52) U.S. Cl.
CPC .......... *G06N 3/08* (2013.01); *G06F 40/174* (2020.01); *G06N 5/025* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,820,075 B2 * | 11/2004 | Shanahan | G06F 16/3344 715/205 |
| 7,254,569 B2 * | 8/2007 | Goodman | G06F 40/174 |
| 7,596,545 B1 * | 9/2009 | Lee | G06Q 30/02 |
| 2011/0249905 A1 * | 10/2011 | Singh | G06K 9/00449 382/225 |
| 2012/0117455 A1 | 5/2012 | Fogel et al. | |
| 2015/0378975 A1 * | 12/2015 | Wu | G06Q 10/10 715/226 |

* cited by examiner

*Primary Examiner* — Vincent Gonzales
(74) *Attorney, Agent, or Firm* — Lewis Roca Rothgerber Christie, LLP

(57) ABSTRACT

A method for autofilling an electronic form is provided. Elements of the electronic form are identified. A value for each identified elements of the electronic form is determined. The electronic form is automatically filled with the determined values. During the automatically filling of the electronic form, the determined value is provided in a field corresponding to each of the elements. A user input is received on the provided value. The received user input includes a correction to a first value provided in a first field of the electronic form. An autofill application is trained using the received user input.

20 Claims, 7 Drawing Sheets

CROWDSOURCED LEARNING ENGINE FOR SEMANTIC ANALYSIS OF WEBPAGES

RELATED APPLICATION

This application claims priority to, and the benefit of, U.S. Provisional Patent Application No. 62/438,008 titled "SEMANTIC ENGINE," filed on Dec. 22, 2016, the entirety of which is hereby incorporated by reference.

BACKGROUND

Users spend a lot of time filling in electronic forms. For example, users fill forms when they create an account for an online service, access electronic mail, or pay for purchases. These forms generally include personal information and authentication information. Filling these forms manually by entering information is time consuming and error prone. In addition, when filling different forms, users tend to use same authentication information because it is easier to remember. However, using the same authentication information poses collateral risks.

Online service providers, therefore, provide autofill solutions. These autofill solutions allow users to automatically fill personal information and generate unique authentication credentials, such as passwords. However, such autofill applications are not always accurate. One reason for the lack of accuracy is the variety of the forms. For example, a single type of form can be coded in different ways using different languages. Hence, the autofill solutions relying on text recognition and/or the hypertext markup language (HTML) to identify and fill forms must account for a variety of differently coded forms seeking similar information.

BRIEF DESCRIPTION OF THE DRAWINGS

Non-limiting and non-exhaustive examples are described with reference to the following figures. As a note, the same number represents the same element or same type of element in all drawings.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Examples of the disclosure provide methods and systems for automatically filling forms. For example, the disclosure provides an autofill system operative to autofill electronic forms. In examples, the disclosed autofill system identifies elements of the form, determines a value for each of the identified elements, and autofill elements of the form with the determined value. In some examples, the autofill system determines values for the elements from a database. The database includes one or more values for the elements of the form collected from users when such values are manually entered. For example, the values are collected from users when the users manually fill the form or correct a value provided by the autofill system.

The disclosed autofill system is scalable by supplementing human supervision in the semantic analysis of elements of a fillable form with crowdsourcing and machine learning. Crowdsourcing is used to provide the machine learning with high-quality and high-volume training data. For example, whenever a user manually corrects an autofilled form, the autofill system will assume that it made a mistake, observe the manual correction, and deduce what the proper interpretation for the form element could have been. The correction information is then sent to a training database to help train the autofill system.

Because of the constant flow of information from users, accuracy of the values provided for the elements may be continuously improved. For example, a machine learning classifier of the autofill system uses the information collected from the users to continuously improve a learning algorithm for identifying elements of the forms and the values associated with the elements. Therefore, in some examples, the machine learning classifier is improved with minimal human intervention. As a result, by supplementing the human supervision in the semantic analysis of elements of a fillable form with crowdsourcing and machine learning, the autofill quality increases and maintenance cost decreases.

Figure 1:
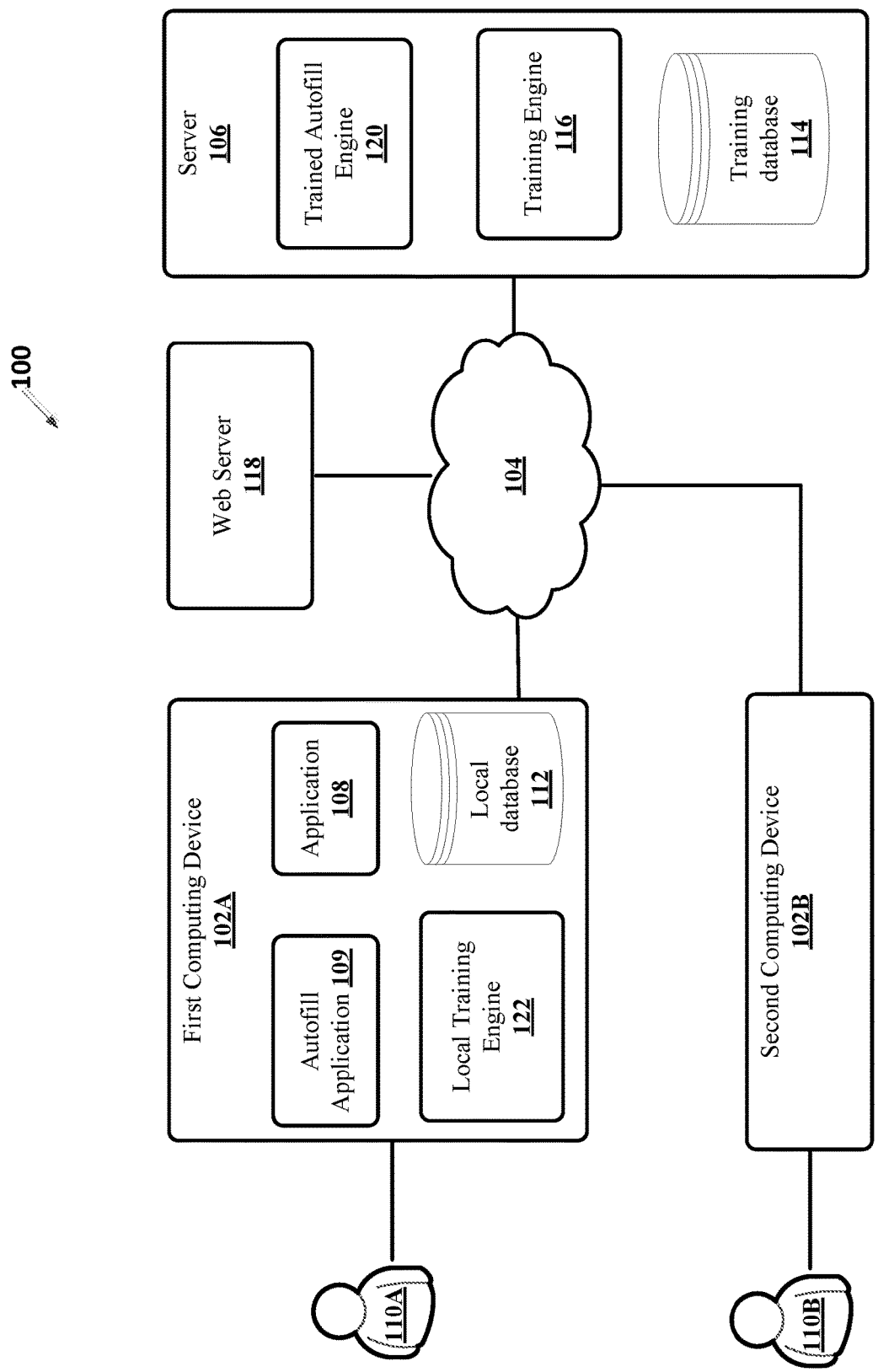
FIG. 1 illustrates an exemplary computing environment in which autofill methods and systems described herein may be implemented.

Referring now to the drawings, in which like numerals represent like elements, various embodiments will be described. FIG. 1 illustrates an example environment 100 in which methods and systems to automatically fill forms may be implemented. As shown in FIG. 1, example operating environment includes a first computing device 102A and a second computing device 102B associated with a first user 110A and a second user 110B respectively.

Computing devices 102A, 102B may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing application 108. User 110 may utilize application 108 on computing device 102 for a variety of tasks, such as accessing emails, banking services, audio/video content, utility bills, etc. An example of application 108 may include a web browser application or an application provided by an online service provider. In some examples, application 108 is operative to provide a front end of a webpage. For example, application 108 is operable to load forms associated with the webpage on computing device 102. In other examples, application 108 may load forms associated with a native application (such as registration and login forms).

Application 108 may include a thick client application, which is stored locally on the computing device 102, or may include thin client application (e.g., a web application) that resides on a remote server and is accessible over a network. A thin client application 108 may be hosted in a browser-controlled environment or coded in a browser-supported language and reliant on a common web browser to render the application 108 executable on the computing device 102.

Computing device 102A further includes an autofill application 109, a local database 112, and a local training engine 122. For clarity, although not illustrated in FIG. 1, computing device 102B can include the same or similar autofill application 109, application 108, local training engine 122 and local database 112 as illustrated with respect to computing device 102A. Autofill application 109 is operative to autofill electronic forms on computing device 102. For example, autofill application 109 is operative to suggest values for one or more elements of an electronic form associated with a webpage being accessed on computing device 102. The suggested values for autofilling the electronic form are associated with user 110. In some examples, autofill application 109 is operable to access these values from local database 112. Local training engine 122 is operable to assist autofill application 109 with identifying elements of a form and identifying values for the elements of the form. In addition, local training engine 122 is operable to assist autofill application 109 with collecting values for and maintaining local database 112.

In some examples, local training engine 122 includes one or more learning algorithms. For example, local training engine 122 can include a Markov-chain type algorithm to recognize known form layouts and associate a probability to each form layouts. The associated probability is used to disambiguate when autofill application 109 hesitates between two possible interpretations of the form and/or elements of the form. In example embodiments, it will be apparent to a person of skill in the art that the Markov-chain type algorithm is only an example of learning algorithm and that local training engine 122 may include other similar learning algorithms.

Although, local training engine 122 and local database 112 are illustrated as separate components in FIG. 1, it will be apparent to a person with skill in the art that local training engine 122 and local database 112 can be part of autofill application 109 or application 108.

In some examples, autofill application 109 is provided as an extension to application 108. For example, autofill application 109 is provided as an extension to a web browser application. In other examples, autofill application 109 is provided as a stand-alone application. In some examples, autofill application 109 is a thin client application or a thick client application.

Computing device 102 is operative to communicate with server 106 and a web server 118 over a network 104. Network 104 may be any type of network capable of facilitating communications between computing device 102, server 106, and web server 118. Examples of such networks include, but are not limited to, LANs, WANs, cellular networks, and/or the Internet. Web server 118 may be operative to host one or more webpages associated with one or more services. In some examples, server 106 and web server 118 comprise one or more computing devices, such as the computing environment illustrated in FIG. 7. In examples, web server 118 and server 106 comprise one or more distributed servers or cloud servers.

Server 106 is operable to improve autofill application 109 through regular updates. Server 106, in some examples, includes a training database 114, a training engine 116, and a trained autofill engine 120. Training database 114 includes training sets which include one or more electronic forms, elements of each form, and values for the elements. The training sets are collected from end users, such as user 110. In addition, the training sets can be created manually by hired users or professionals. Moreover, and as explained below, the training sets in the training database 114 may be collected from both active user contributions and passive user contributions.

Training engine 116 is operable to use the training sets collected in training database 114 to update trained autofill engine 120. Training engine 116 includes one or more learning algorithms to update the trained autofill engine 120. For example, training engine 116 is operable to use feature tokenization to train a machine learning model. Training engine 116 is then operable to replace an analysis layer of trained autofill engine 120 with a trained machine learning model. The updates are then propagated to autofill application 109 and local training engine 122.

In some examples, training engine 116 is operable to generate one or more rules from user reports collected in the training sets. For example, training engine 116 is operable to generate rules for determining identities of elements of a form based, in part, on user corrections of the autofilled values. Training engine 116 may also be operable to generate rules for determining values for the elements of the form based on the user corrections of the autofilled values. Training engine 116 is then operable to test the extracted rules against known cases. For example, training engine 116 is operable to apply the extracted rules on tagged, ground truth training sets.

In some examples, training engine 116 is operable to determine elements of the forms by recognizing a pattern of elements in the form (also referred to as form layouts). For example, a pattern of elements may include a first name, a middle name, and a last name. Another pattern may include a first name and a last name with no middle name element. In some cases there may be an ambiguity regarding identification of an element of a pattern. In some examples, training engine 116 is operable to disambiguate one or more unknown patterns using the known analysis patterns. For example, training engine 116 is operable to, e.g., using a Markov-chain-type algorithm, recognize known form layouts and associate a probability to each recognized form layout. The associated probability enables the autofill application 109 to disambiguate between two possible interpretations. In some examples, the most empirically common form layout is used to break the ambiguity.

In some examples, using a machine learning algorithm, such as Naive Bayes algorithm or Neural-Network algorithm, training engine 116 is operable to replace parts of the status quo analysis. Replacing the status quo analysis requires training engine 116 to find the best features (or variables) to feed the machine learning algorithm, especially if the chosen machine learning algorithm is not a deep learning algorithm.

In some examples, using the error reports from other sources, training engine 116 is operable to automatically handle the status quo analysis and test the resulting analysis engine against known cases ("genetic learning"). For example, using proactive error reports from such sources, training engine 116 is operable to automatically shortlist the changes that are suggested by the most users and apply them in a way that overrides the existing analysis layer of the trained autofill engine 120. Error reports from other sources may include error reports from anonymized usage logs or from proactive user contributions. For example, the error reports may be provided by a third-party provider that collects and anonymizes usage logs. In other examples, a user may explicitly indicate that an autofilled element of a form is incorrect and provide a correct identification of the element. An example method for collecting error reports is described with reference to FIG. 3.

In some examples, the training engine 116 updates the trained autofill engine 120 to incorporate learned examples. Trained autofill engine 120 is then distributed to computing device 102. In some examples, only a portion of trained autofill engine 120 is distributed to computing device 102. Autofill application 109 on computing device 102 is synched with the trained autofill engine 120. In some examples, local training engine 122 is also updated with training engine 116. Updates to autofill application 109 and local training engine 122 are performed periodically or upon detection of a predetermined number of user feedback examples. In other examples, the functions of the local training engine 122 and local autofill application 109 may be performed by a hosted service, such as a service on server 106.

Figure 2:
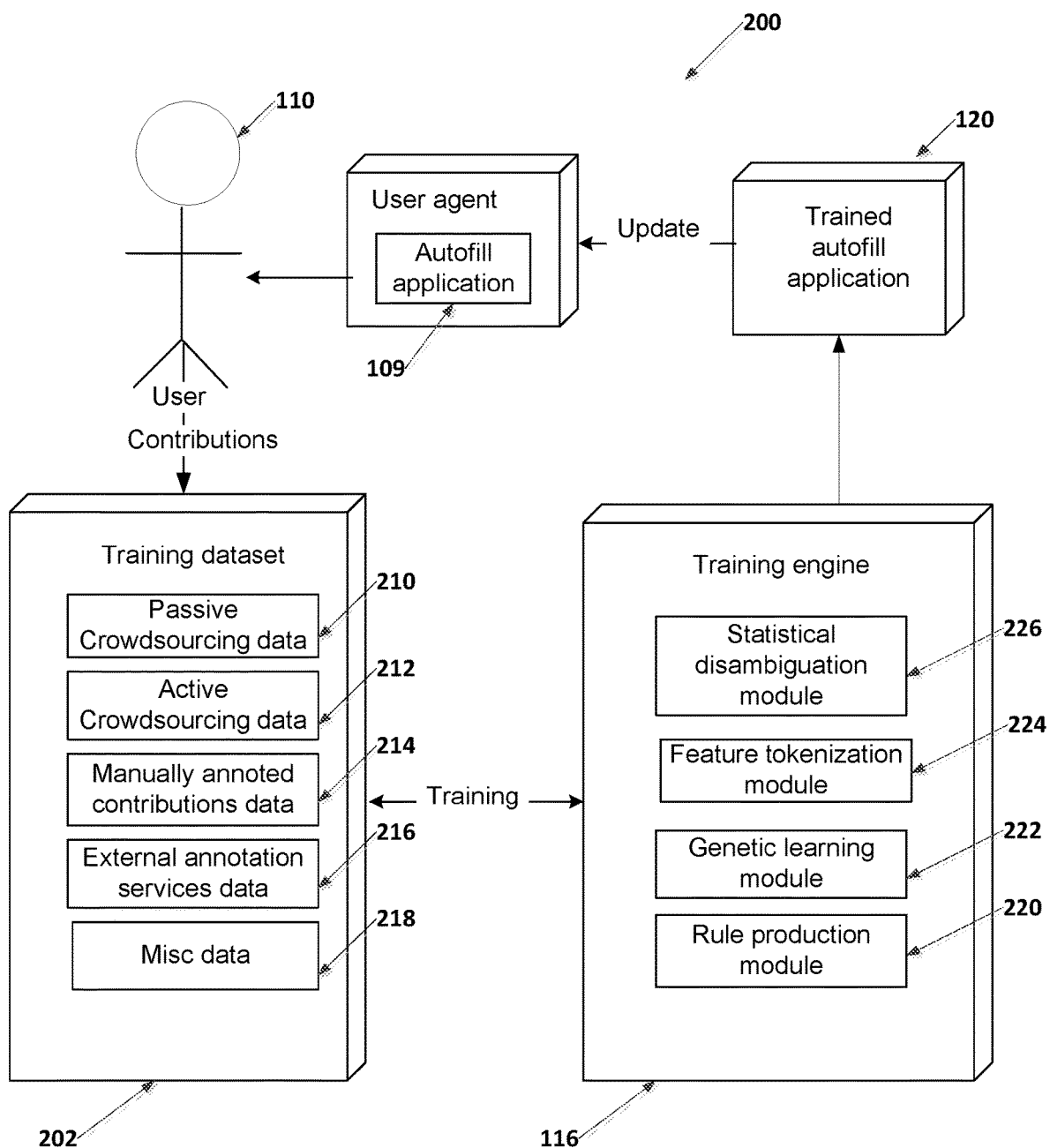
FIG. 2 illustrates an example of an autofill system as described herein.

FIG. 2 illustrates an autofill system 200. Autofill system 200 may include training dataset 202. Training dataset 202 includes feedback and corrections, such as annotated webpages, obtained from user 110 contributions. As used herein, annotated webpages includes annotated web page forms and form elements. For example, and as shown in FIG. 2, training dataset 202 includes passive crowdsourcing data 210, active crowdsourcing data 212, manually annotated contributions data 214, external annotation services data 216, and miscellaneous data 218. Passive crowdsourcing data 210 is discussed in greater detail with respect to FIG. 3. Active crowdsourcing data 212 is discussed in greater detail with respect to FIG. 4.

Manually annotated contributions data 214 includes legacy database of known cases. For example, manually annotated contributions data 214 includes a corpus of annotated webpages. In another example, manually annotated contributions data 214 includes empirical cases (e.g. annotated webpages) that are added to training dataset 202 by a research team associated with system 200. External annotations services data 216 includes corpus of annotated webpages that are manually annotated by one or more users 110. For example, one or more commercial service providers may be hired to focus on specific types of cases that are to be added to training dataset 202. Miscellaneous data 218 includes additional sets of annotated webpages or other forms of known cases. In example embodiments, known use cases are stored as use cases where a certain form element is known to correspond to a particular type of data. For example, an association of certain characteristics of the form element (i.e., user-readable name, data format, programming language, etc.) is stored with a data type (e.g., phone_number).

As shown in FIG. 2, training dataset 202 is used by training engine 116. In some examples, and as illustrated in FIG. 2, training engine 116 includes a rule production module 220, a genetic learning module 222, a feature tokenization module 224, and a statistical disambiguation module 226. Rule production module 220 includes a database of legacy rules and is operable to use the legacy rules to autofill a form. Genetic learning module 222 is operable to generate one or more autofill rules using learning methods and training dataset 202. A method for generating autofill rules using learning algorithms is described in greater detail with respect to FIG. 5. Feature tokenization module 224 is operable to pre-process training data (e.g., simplify words and sentences to make is easier to use with machine learning models. Statistical disambiguation module 226 is configured to resolve ambiguities in prediction of a value of an element of the form. A method for resolving such ambiguity is discussed in greater detail with respect to FIG. 6.

Figure 3:
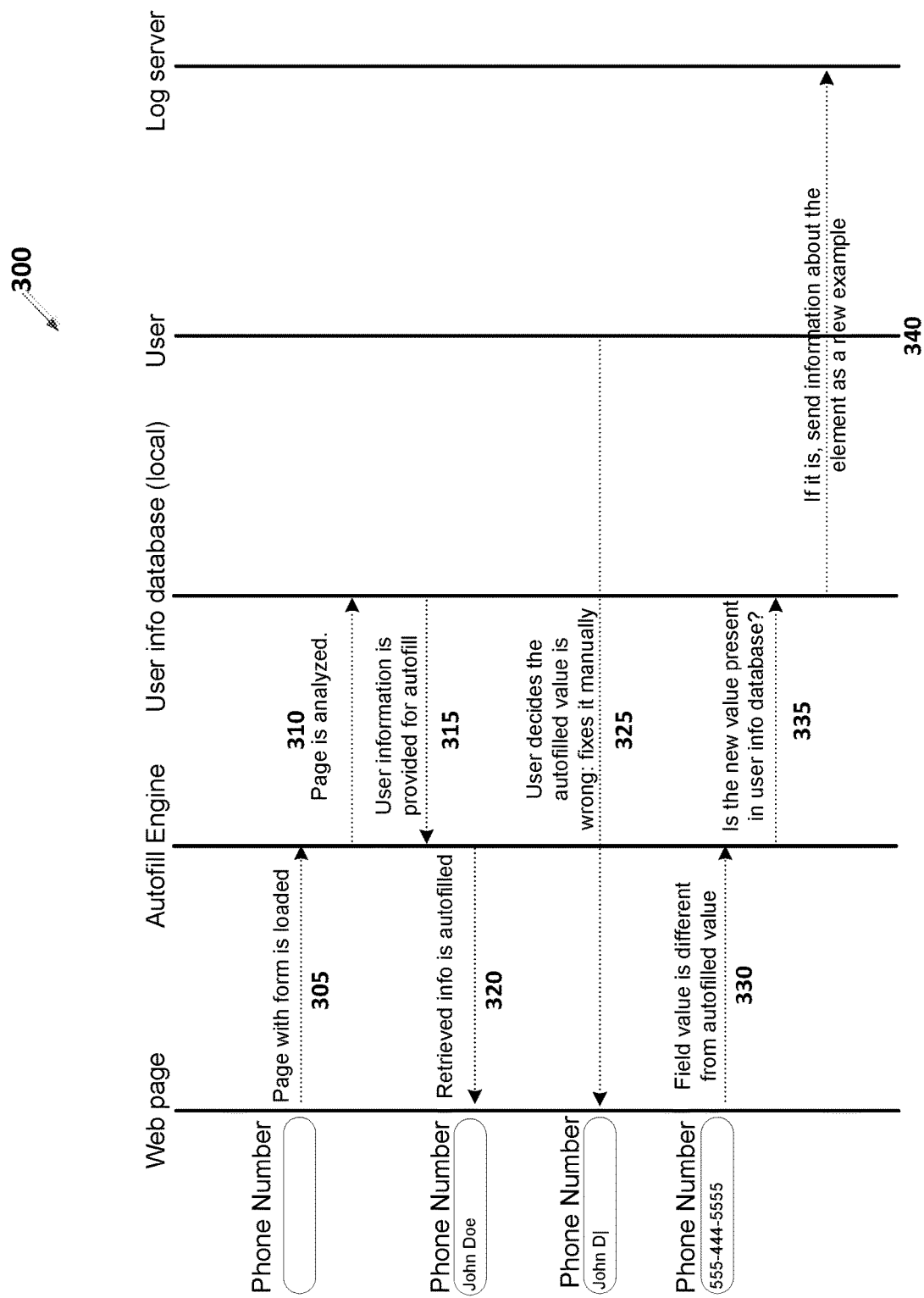
FIG. 3 illustrates an exemplary flow diagram illustrating steps of a method for collecting passive crowdsourcing data as described herein.

FIG. 3 is an example flow diagram illustrating steps of a method 300 for collecting passive crowdsourcing data, such as passive crowdsourcing data 210. In examples, users may be provided with the option to opt out of having their corrections used in improving the autofilling systems and methods contemplated herein. In example embodiments, such as shown in FIGS. 1 and 2, passive contributions occur when user 110 manually inputs a correction to an autofill mistake, and system 200 is able to match the manual input with a data in the user's profile. For example, for a detected form element, autofill application 109 may guess "31 Maple Avenue." User 110 sees that the form element is actually calling for a phone number and inputs the user's phone number (555-444-5555). Autofill application 109 detects the correction and matches the phone number to the user's phone number in his profile. Autofill application 109 determines that number string 555-444-5555 is in the phone_number field of the profile. In addition, autofill application 109 determines that the form element that was corrected calls for phone_number data element.

Such contributions may be detected at computing device 102 (i.e. on user's computer), and sent to server 106 in an anonymous way. For example, autofill application 109 sends to server 106 the characteristics of the form element along with confirmation that the form element is associated with "phone_number" data element without identifying user 110 in any way, in order to respect the privacy of the browsing usage of the user.

For example, at operation 305 of method 300, a webpage with a form is loaded. For example, in the exemplary systems described in FIGS. 1 and 2, the form is loaded by application 108 on computing device 102. For example, user 110 may open application 108 or a webpage renderer to access a webpage of an online service. A webpage form, such as a sign-in page with a sign-in form, is then loaded on the webpage renderer. In some examples, the webpage form is rendered on computing device by web server 118. In other examples, the webpage form is rendered from a local cache.

After loading the webpage form at operation 305, method 300 proceeds to operation 310, where the webpage form is analyzed. For example, elements of the form may be identified. For example, in the exemplary systems described in FIGS. 1 and 2, autofill application 109 is operative to identify the elements of the form using the trained autofill engine 120 replicated, or accessed, from server 106. The elements may include one or more user information fields. For example, the elements may include one or more of a first name field, a last name field, an email address field, a password field, a phone number field, a mailing address field, payment method field, a credit card number field, an address field associated with the credit card, a card type field, an age field, a sex field, etc. In some examples, autofill application 109 is operable to identify only required fields of the form.

After analyzing the form at operation 310, method 300 proceeds to operation 315, where user information is provided. For example, in the exemplary systems described in FIGS. 1 and 2, after identifying elements (or fields) of the form, autofill application 109 is operable to fetch the user information related to the elements from a profile for user 110, which may be stored at local database 112. In some examples, autofill application 109 is operable to fetch the user information for the identified elements from server 106. The fetched user information is provided to the webpage form or application 108.

After fetching the user information at operation 315, method 300 proceeds to operation 320, where the form is autofilled. For example, in the exemplary systems described in FIGS. 1 and 2, autofill application 109, after fetching the user information, is operative to include or insert the user information in the corresponding elements of the form. For example, and as shown in FIG. 3, autofill application 109 may fill the identified element of the form with the name of user 110. In some examples, application 108 is operable to fill the form with the user information provided by autofill application 109.

After autofilling the form at operation 320, method 300 proceeds to operation 325 where user input may be received to fix one or more autofilled values. For example, and as shown in FIG. 3, the phone number field of the form is incorrectly filled with the name of user 110. User 110 may determine that the autofilled value is incorrect and may fix the value(s) by entering a correct value. For example, and as shown in FIG. 3, user may delete the first name from the phone number field and enter his phone number 555-444-5555. In some examples, autofill application 109 is operable to detect user activity on autofilled forms. For example, autofill application 109 is operable to detect when user changes an autofilled value for an element of the form.

After detecting a correction of the autofilled value by user 110 at operation 325, method 300 proceeds to operation 330, where it is determined whether the user-provided value is different from the autofilled value. For example, autofill application 109 is operable to determine whether during the correction of the autofilled value at operation 325, the user 110 provided a value that is different from the autofilled value. In another example, autofill application 109 is operable to determine whether the field itself was misidentified or whether the field was identified correctly but merely the value of the field was misidentified.

After determining that the user-provided value is different from the autofilled value at operation 330, method 300 proceeds to operation 335, where it is determined whether the user-provided value is identifiable as a particular data type or defined data element. For example, autofill application 109 is operable to determine whether the user-provided value is present in a user profile stored in local database 112. If the user-provided value is present in local database 112, autofill application 109 may determine that the error occurred because of a misidentification of the field and can now associate the field with a particular data element and other semantic data about the field. In another example, server 106 is operable to determine whether the user-provided value is present in training database 114 or has a recognizable pattern (such as a phone number or email address).

After determining that the user-provided value is identifiable at operation 335, method 300 proceeds to operation 340, where the user-corrected form or element of the form is marked as a training example. For example, the identification of the field (also referred to herein as a form element) corrected by user 110 is identified and marked. In examples, the annotated webpage along with a correct identification of the field is stored in training database 114 to be used by training engine 116. In some examples, autofill application 109 is operative to send the annotated webpage, along with a keyword and/or a label, to training database 114. In other examples, rather than an annotated webpage, the autofill application 109 may extract characteristics of the form element (such as the human-readable label, the programming language, the formatting of the form element, etc.) and associate such characteristics with the correct identification of the data element called for by the form element. The paired characteristics of the form element and the correct identification of the data element called for by the form element may be stored and sent to training database 114.

Figure 4:
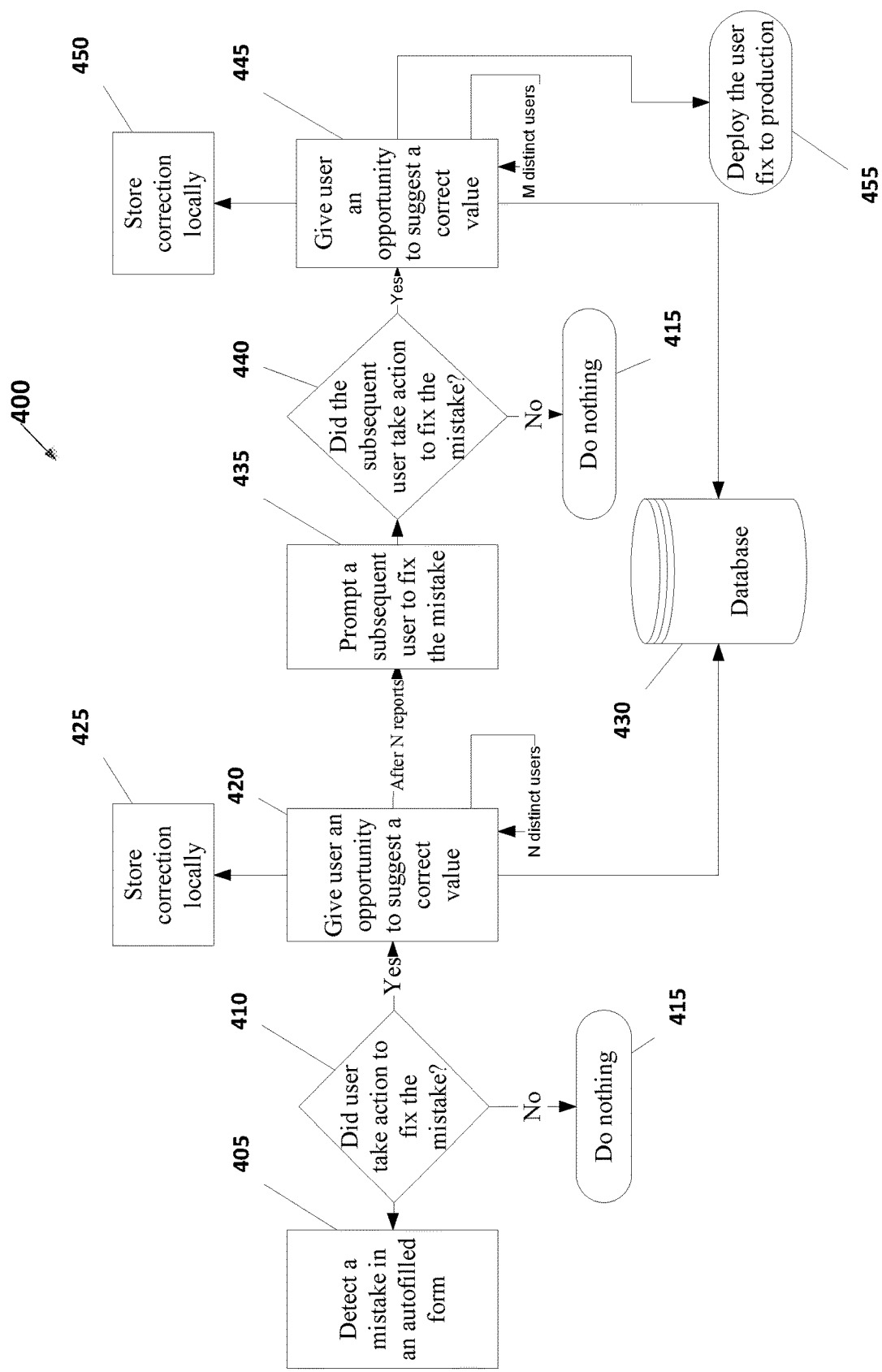
FIG. 4 illustrates an exemplary flow diagram illustrating steps of a method for collecting active crowdsourcing data as described herein.

FIG. 4 is an example flow diagram illustrating steps of a method 400 for collecting active crowdsourcing data 212. Active crowdsourcing data 212 is collected from one or more users 110 through voluntary contributions. For example, autofill application 109 is operable to detect that user 110 is experiencing one or more issues with the autofilled values in a form or with autofill application 109. Autofill application 109, upon detecting such issues, is operable to provide an interface for the user 110 to fix the detected problem. Such active contributions from one or more users are aggregated as active crowdsourcing data 212. In some examples, such voluntary contributions are presumably more reliable. Hence, active crowdsourcing data 212 in training database 114 is used by training engine 116 to improve trained autofill engine 120 and may be weighted differently from passively collected data. Trained autofill engine 120 is operative to then propagate the improvement to autofill application 109.

For example, at operation 405 of method 400, a mistake is detected in a form element of an autofilled form. For example, form elements of the form may be autofilled by autofill application 109. The mistake (also referred to as an error) may be detected by user 110 in a form element autofilled by autofill application 109. For example, autofill application 109 may have filled a first name element of the form with a phone number associated with user 110. Such autofill errors may be because of a misrecognition of the data type being called for by the form element by autofill application 109.

After detecting the error with the autofill at operation 405, method 400 proceeds to decision operation 410 where method 400 detects whether user 110 took an action to correct an error in the autofilling of the element. If user 110 did not take any action to correct the error at decision operation 410, method 400 proceeds to operation 415 and does nothing. However, if user 110 did take an action to correct the error at decision operation 410, method 400 proceeds to operation 420 where method 400 provides an opportunity to user 110 to suggest a correct value for the detected error. For example, autofill application 109 is operative to provide a feedback form to user 110 to provide a corrected value. In other examples, autofill application 109 may prompt the user to identify the data type that is being called for by the form element by providing example data type choices to the user. In some examples, autofill application 109 is operative to provide an electronic messaging interface or an electronic email for user 110 to provide correct data.

After providing user 110 with an opportunity to suggest a correction at operation 420, method 400 proceeds to operation 425 where such user-provided correction is stored locally for user 110. For example, authentication application 109 is operable to store user-suggested corrections in local database 112. In addition to saving the user-suggested correction locally at operation 425, method 400, at operation 430, sends the user-suggested corrections as a training example. For example, autofill application 109 is operative to send the user-suggested corrections to training database 114. As discussed, the correction may include the annotated webpage and/or an identification of characteristics of the field identification corrected by user 110. In some examples, autofill application 109 is operable to keep track of a number of user suggested correction for a misidentified form element.

In examples, after detecting a predetermined number of user-suggested corrections at operation 420, method 400 proceeds to operation 435 where a subsequent user (or one or more other users) receives a prompt to fix the flaw automatically. For example, autofill application 109, after a predetermined number of users suggested correction for a flaw, is operable to provide a prompt for the subsequent user to fix the error. The prompt may include a link directing the subsequent user 110 to a place to suggest correction for the user.

After providing the prompt at operation 435, method 400 proceeds at decision operation 440, where method 400 detects whether action was taken to fix the error. For example, autofill application 109 is operable to detect whether the subsequent user clicked on the link provided in the prompt. If the subsequent user did not take any action on the prompt at decision operation 440, method 400 proceeds to operation 415 and does nothing. However, if the subsequent user did take an action on the prompt at decision operation 440, method 400 proceeds to operation 445 where method 400 provides an opportunity to the subsequent user to suggest a correct value for the detected flaw. In other examples, autofill application 109 may prompt the subsequent user to identify the data type that is being called for by the form element by providing example data type choices to the subsequent user. For example, autofill application 109 is operative to provide a feedback form to the subsequent user to provide the correct data. In some examples, autofill application 109 is operative to provide an electronic messaging interface or an electronic email for the subsequent user to provide the correct data.

After providing the subsequent user with an opportunity to suggest a correction at operation 445, method 400 proceeds to operation 450 where such user provided correction is stored locally. For example, authentication application 109 is operable to store user-suggested corrections in local database 112. In addition to saving the user-suggested corrections locally at operation 450, method 400, at operation 430, sends the user-suggested corrections as a training example. For example, autofill application 109 is operative to send, e.g., the annotated webpage including the form and identification of the correct data element for the field corrected by user 110 to training database 114.

In some examples, autofill application 109 is operable to keep track of a number of user-suggested corrections for a misidentified form element. After detecting a predetermined number of user-suggested corrections (noted in FIG. 4 as a variable "M" distinct users) at operation 445, method 400 proceeds to operation 455 where the user-suggested corrections are deployed to production. For example, training engine 116 is operative to deploy the user-suggested corrections to modify the trained autofill application 120, which subsequently is synchronized with autofill application 109.

Figure 5:
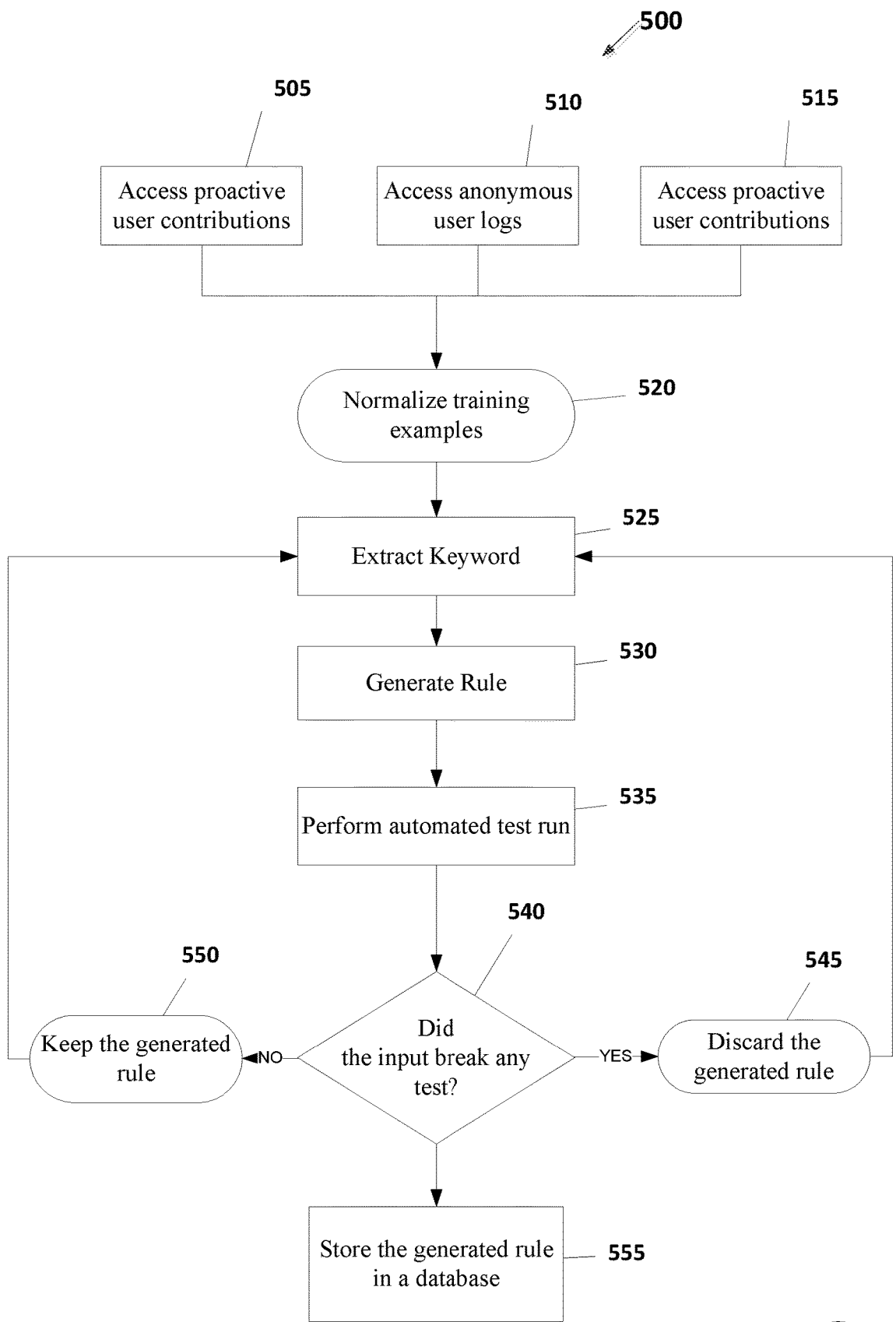
FIG. 5 illustrates an exemplary flow diagram illustrating steps of a method for training an autofill engine as described herein.

FIG. 5 is an example flow diagram illustrating steps of a method 500 for training an autofill engine. For example, method 500 may be used to train autofill engine 109, with user contributions and training examples. At operation 505 of method 500, proactive user contributions are accessed. For example, training engine 116 is operative to access the proactive user contributions from training database 114. At operation 510 of method 500, anonymous user logs are accessed. For example, training engine 116 is operative to access the anonymous user logs from training database 114. At operation 515 of method 500, other training examples are accessed. For example, training engine 116 is operative to access the other training examples (such as ground truth data sets) from training database 114.

After accessing training examples at operations 505, 510, 515, method 500 proceeds to operation 520, where the accessed training examples are normalized. For example, training engine 116 is operative to normalize the training examples for processing. Normalization of the training examples may include harmonizing format of the training examples that come from different sources.

After normalizing the training examples at operation 520, method 500 proceeds to operation 525, where keywords are extracted. For example, training engine 114 is configured to extract keywords from the normalized training examples. In example embodiments, an element is extracted from accessed proactive user contributions 505, anonymous user logs 510, and other user contributions 515. After extracting the element, one or more characteristics of the element are extracted. Extracted characteristics may include an element name, html attributes, etc. The extracted characteristics may be stored for the elements in a file or database. The extracted characteristics are then split to extract keywords. The extracted keywords may include a single word or two consecutive words. In example embodiments, the extracted keywords are prioritized. For example, the extracted keywords are prioritized based on a term frequency-inverse document frequency (Tf-IDf) technique. The Tf-IDf technique includes a statistical measure that evaluates how important a word is to a document regarding its whole presence in a collection of documents. In example embodiments, "documents" may include elements of the form.

After extracting keywords at operation 525, method 500 proceeds to operation 530 where a rule is generated. For example, training engine 116 is operable to generate a rule from the extracted keywords and the normalized training examples. The generated rule, for example, may include a rule to identify an element of a form. In some examples, the generated rule may include a rule to identify a pattern of the form element or the form itself. In some examples, training engine 116 is operative to generate the rule. As a simple example, in training examples, if "blabla" is a user-facing text for a given element and is tagged as phone_number, then an example extracted rule may include that if a user-facing text for a given element of the form contains "bla," then it is a phone number. In example embodiments, the extracted rules are more generic than the training examples. The genericity of the extracted rules may be incrementally decreased (e.g., by lengthening the user-facing text used in the rule) every time the extracted rule fails a test run. For example, the system may try "b" or "bl" and fail a test run on each before succeeding with "bla." The last-generated rule can be stored because it passed the test runs and is based on empirical information. This is only a simple example of one of many ways in which rules can be generated.

After generating the rule at operation 530, method 500 proceeds to operation 535, where automated test runs are conducted for the generated rule. For example, the generated rule is applied to one or more known (ground truth) cases stored in training database 114. More specifically, the generated rule is applied to annotated webpage forms stored in training database 114. In some examples, training engine 116 is operative to conduct the automated test runs for the generated rule.

After conducting automated test runs on the generated rule at operation 535, method 500 proceeds to decision operation 540, where it determines whether the generated rule failed the automated test run. For example, training engine 116 is operative to determine whether the generated rule failed to correctly identify an element of a test page. In some examples, training engine 116 is operative to determine whether the generated rule successfully identifies new training examples (for example, the new training examples gathered from users), and avoids breaking previously known and working training examples.

If the generated rule did not fail any automated test runs at decision operation 540, method 500 proceeds to operation 550, where the generated rule is kept. For example, training engine 116 is operable to keep the generated rule if the generated rule correctly predicted values for the annotated forms used during the automated test run. Such rule may then be incorporated into the decision model of the trained autofill engine, such as trained autofill engine 120, such that the rule can be used in future identifications of form elements. However, if the generated rule did fail a predetermined number of automated test runs at decision operation 540, method 500 proceeds to operation 545, where the generated rule is discarded. For example, training engine 116 is operative to discard the generated rule if it failed any of the automated test runs. In some examples, training engine 116 is operative to discard the generated rule if it failed a predetermined number of the automated test runs. In other examples, as explained above, the training engine may iteratively attempt more specific rules until finding one that passes the requisite tests.

After determining whether to keep or discard the generated rule at decision operations 550 and 545 respectively, method 500 loops back to operation 525 to extract another keyword. For example, after completion of evaluation of a first extracted keyword, a second keyword is extracted from the normalized training examples. In some examples, a predetermined number of keywords and rules are extracted from the normalized training examples.

In addition, after determining whether to keep or discard the generated rule at decision operations 550 and 545 respectively, method 500 proceeds to operation 555 where the tested rule is stored in a log. For example, training engine 114 is operable to create a genetic log and store the generated rules, automated tests run on the generated rules, and outcome of the tests.

Figure 6:
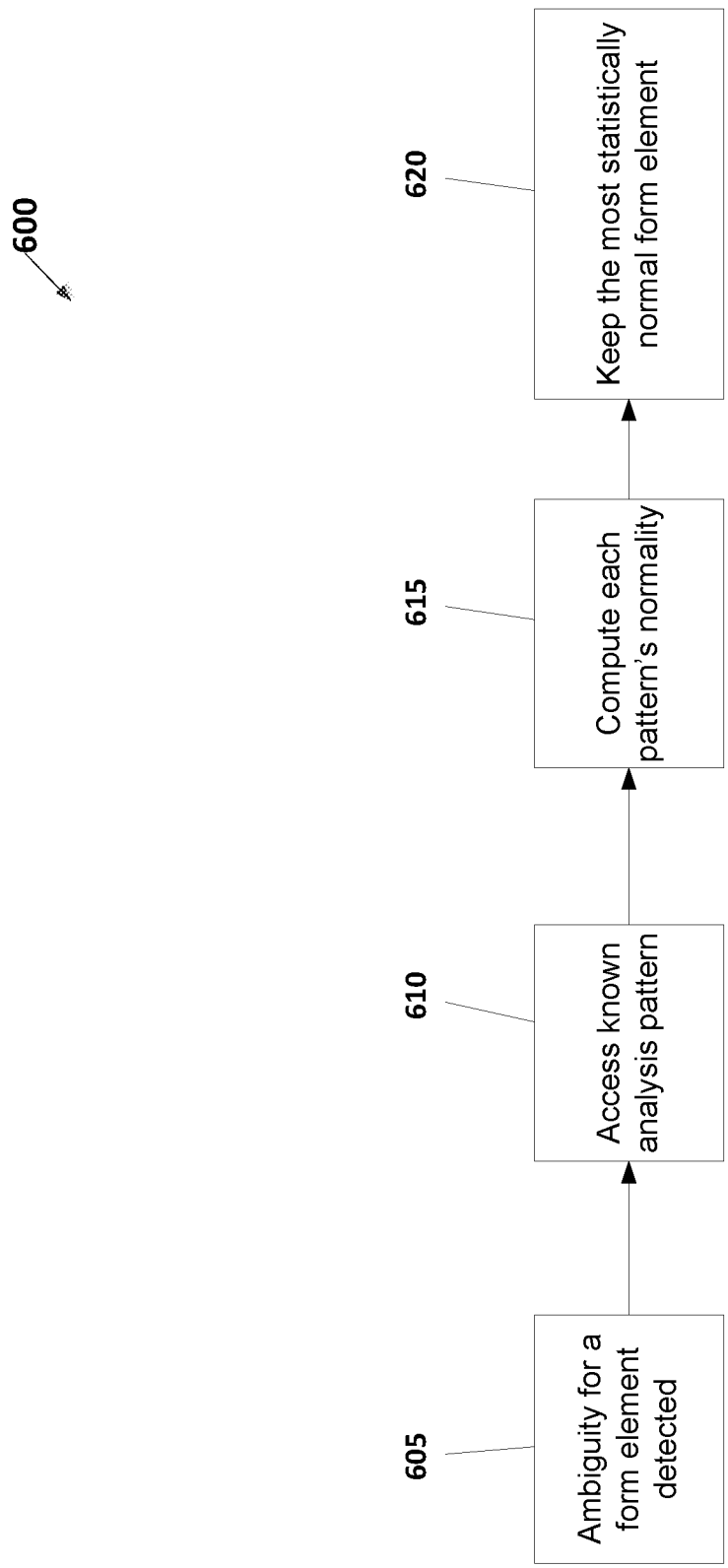
FIG. 6 illustrates an exemplary flow diagram illustrating steps of a method for resolving an ambiguity as described herein.

FIG. 6 is an example flow diagram illustrating steps of a method 600 for resolving an ambiguity. For example, there are instances when autofill application 109 predicts more than one value for an element of a form. For example, autofill application 109 may predict an element of a form to have a 69% chance of being a first name field and a 68% chance of being a middle name field. Autofill application 109, in such scenario, cannot determine a certain enough identification of the form element. In such scenarios, autofill application 109 is operative to use a statistical disambiguation analysis. Method 600 provides steps for such statistical disambiguation analysis.

For example, at operation 605 of method 600 an ambiguity in identification of an element of a form is detected. The ambiguity in the identification of the element may be determined by comparing the elements of the forms with known patterns. For example, for the given form, autofill application 109 determines that a first element is a first name field, a second element is both a first name field and a middle name field, and a third element is a last name field. The degree of certainty in the determination for the first element to be the first name field is 98%. The degree of certainty in the determination for the third element to be the last name field is 95%. The degree of certainty in the determination for the second element being a first name field is 69% and being a middle name is 68%. Hence, there is ambiguity in identification of the second element of the form, as predictions for it being a first name field and a middle name field are substantially close (i.e. almost the same).

After detecting the ambiguity at operation 605, method 600 proceeds to operation 610, where one or more known analysis patterns are accessed. For example, autofill application 109 is operative to access known analysis patterns associated with forms including one or more name fields. In example embodiments, known analysis patterns may include an expected sequence of elements in a form. For example, the expected sequence of elements for an address form may include a full name field, followed by an address line 1 field, followed by an address line 2 field, followed by a city field, followed by a state field, followed by a zip code field, and a country field. In some examples, such known analysis patterns are identified from local database 112 or from training database 114.

After accessing the known analysis patterns at operation 610, method 600 proceeds to operation 615, where each pattern's normality score is determined. For example, autofill application 109 is operative to determine a first normality score corresponding to a first pattern comprising a first name field then a last name field and then a second last name field. Then, autofill application 109 is operative to determine a second normality score corresponding to a second pattern comprising a first name field then a middle name then a last name field. For example, autofill application 109 may determine that the normality score for the first pattern is 2 while the normality for the second pattern is 821. A normality score of a pattern is determined based on a number of instances of occurrence of the pattern in training database 114.

After determining the normality score at operation 615, method 600 proceeds to operation 620, where a decision for the identity of the field is made. For example, autofill application 109 is operable to determine the identity of ambiguous field based on the determined normality score for the known analysis pattern. In determining the identity based on normality score, autofill application 109 is operable to keep the most statistically normal pattern. For example, autofill application 109 is operable to determine the identity of the ambiguous field to be that with the highest normality score among the known analysis patterns.

Figure 7:
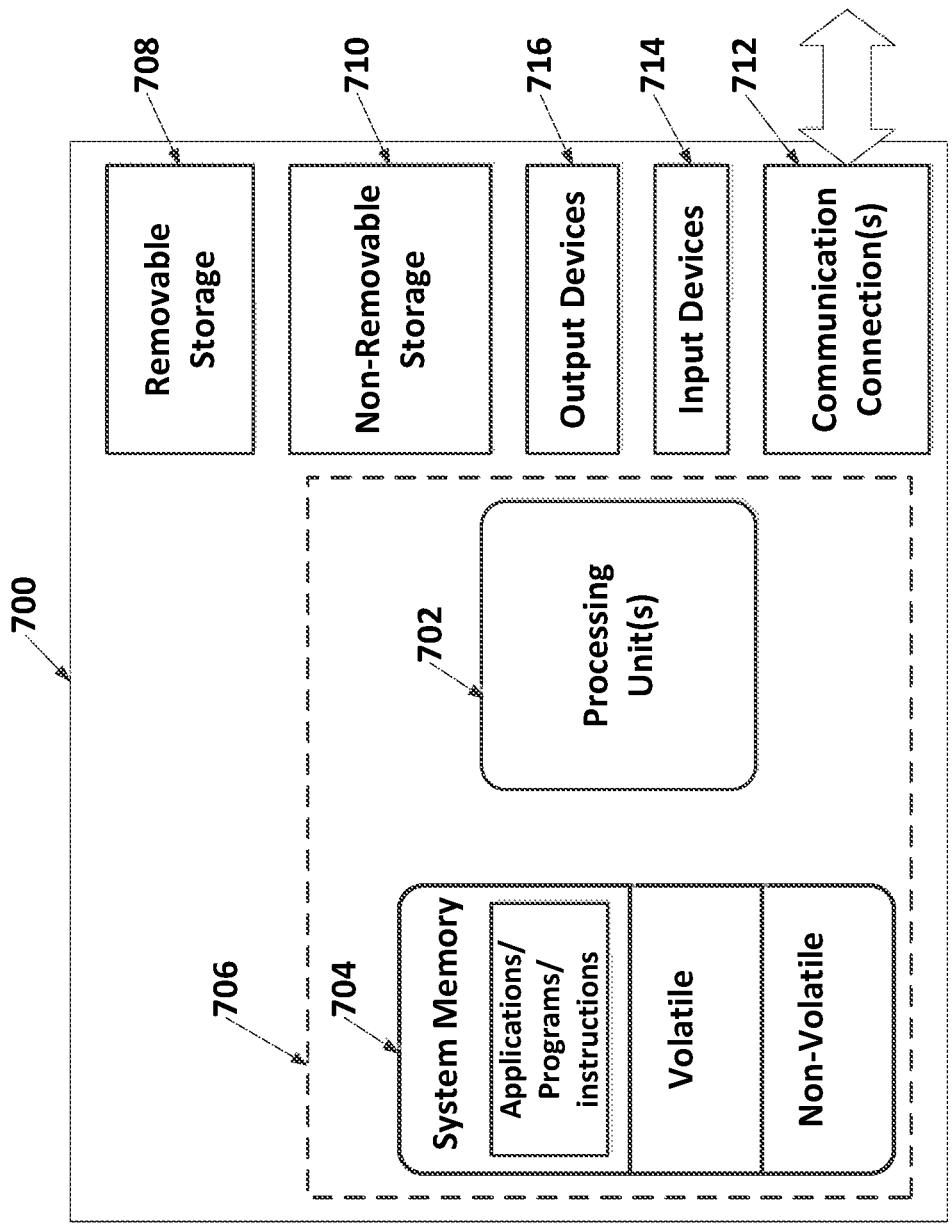
FIG. 7 illustrates one example of a suitable operating environment in which one or more of the present examples may be implemented.

FIG. 7 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 7 illustrates one example of a suitable operating environment 700 in which one or more of the present embodiments may be implemented. For example, computing devices such as computing device 102, server 106, web server 118, etc., may comprise the system 700. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically may include at least one processing unit 702 and memory 704. Depending on the exact configuration and type of computing device, memory 704 (storing, among other things, venue-based applications module(s), e.g., venue check-in applications, venue search applications, geocoding/reverse geocoding applications, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 7 by dashed line 706. Further, environment 700 may also include storage devices (removable, 708, and/or non-removable, 710) including, but not limited to, magnetic or optical disks or tape. Similarly, environment 700 may also have input device(s) 714 such as a keyboard, mouse, pen, voice input, etc. and/or output device(s) 716 such as a display, speakers, printer, etc. Also included in the environment may be one or more communication connections, 712, such as LAN, WAN, point to point, etc.

Operating environment 700 may include at least some form of computer readable media. The computer readable media may be any available media that can be accessed by processing unit 702 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media does not include media propagated or otherwise modulated data signal.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 704, such as autofill application 109. While executing on the processing unit 702, program modules 708 (e.g., applications, Input/Output (I/O) management, and other utilities) may perform processes including, but not limited to, one or more of the stages of the operational methods described herein such as method 300, method 400, method 500, and method 600 illustrated in FIGS. 3, 4, 5, and 6 for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 700 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown.

Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for autofilling an electronic form, the method comprising:
    identifying an element of a first instance of an electronic form;
    determining a first value for the identified element of the first instance of the electronic form;
    automatically filling the identified element of the first instance of the electronic form with the determined first value using an autofill application;
    receiving first user input on the determined first value to produce a first corrected value for the identified element;
    determining whether the first corrected value for the element is identifiable;
    determining, when the first corrected value is identifiable, that the identified element was misidentified;
    causing characteristics of the electronic form and a first data type of the first corrected value to be stored as a first training example in a training database;
    identifying the element of a second instance of the electronic form;
    determining a second value for the identified element of the second instance of the electronic form;
    automatically filling the identified element of the second instance of the electronic form with the determined second value using the autofill application;
    detecting that the second user is experiencing an issue with the second determined second value;
    presenting, in response to detecting the issue, a user interface to correct the issue;
    receiving, through the user interface, second user input on the determined second value to produce a second corrected value for the identified element, wherein the second user input explicitly identifies a second data type;
    causing characteristics of the electronic form and the second data type of the second corrected value to be stored as a second training example in the training database; and
    training the autofill application using the first training example and the second training example, wherein the second training example is weighted differently from the first training example.

2. The method of claim 1, wherein identifying the element of the first instance of the electronic form comprises identifying the element based on known patterns of the electronic form.

3. The method of claim 2, wherein identifying the element of the first instance of the electronic form based on the known patterns comprises predicting a likelihood of an identity of the element of the first instance of the electronic form based on the known patterns.

4. The method of claim 3, further comprising detecting an ambiguity in the identity of the identified element of the first instance of the electronic form based on the predicted likelihood.

5. The method of claim 4, wherein detecting the ambiguity comprises determining the identity of the element of the first instance of the electronic form to be ambiguous when a first predicted likelihood based on a first known pattern and a second predicted likelihood based on a second known pattern are within a threshold margin.

6. The method of claim 4, further comprising
    determining a first normality score for the first known pattern;
    determining a second normality score for the second known pattern; and
    resolving the ambiguity in favor of a greater of the first normality score and the second normality score.

7. The method of claim 1, wherein training the autofill application comprises:
    extracting at least one rule from the stored first and second training examples; and
    testing the at least one extracted rule on one or more training forms, wherein testing the extracted rule comprises determining whether the extracted rule correctly identified a test element of the one or more training forms.

8. The method of claim 7, further comprising:
    incorporating the at least one rule in the autofill application when the at least one rule correctly identified the test element of the one or more training forms.

9. The method of claim 1, wherein training the autofill application comprises training the autofill application using a learning algorithm, and further comprising using the trained autofill application to identify an additional element of a different electronic form.

10. A system for autofilling forms, comprising:
    at least one processor; and
    a memory storage device including instructions that, when executed by the processor, cause the at least one processor to perform a method, the method comprising:
        identifying an element of a first instance of an electronic form;
        determining a first value for the identified element of the first instance of the electronic form;
        automatically filling the identified element of the first instance of the electronic form with the determined first value using an autofill application;
        receiving first user input on the determined first value to produce a first corrected value for the identified element;
        determining whether the first corrected value for the element is identifiable;
        determining, when the first corrected value is identifiable, that the identified element was misidentified;
        causing characteristics of the electronic form and a first data type of the first corrected value to be stored as a first training example in a training database;
        identifying the element of a second instance of the electronic form;
        determining a second value for the identified element of the second instance of the electronic form;
        automatically filling the identified element of the second instance of the electronic form with the determined second value using the autofill application;
        detecting that the second user is experiencing an issue with the second determined second value;

presenting, in response to detecting the issue, a user interface to correct the issue;

receiving, through the user interface, second user input on the determined second value to produce a second corrected value for the identified element, wherein the second user input explicitly identifies a second data type;

causing characteristics of the electronic form and the second data type of the second corrected value to be stored as a second training example in the training database; and training the autofill application using the first training example and the second training example, wherein the second training example is weighted differently from the first training example.

11. The system of claim 10, wherein the method further comprises:

extracting at least one rule from one or more training examples stored in the training database; and testing the at least one extracted rule on one or more training forms, wherein testing the extracted at least one rule comprises determining whether the extracted at least one rule correctly identified a test field of the one or more training forms.

12. The system of claim 10, wherein the method further comprises:

incorporating the at least one rule in the autofill application when the at least one rule correctly identified the test field of each of the one or more training forms.

13. The system of claim 10, wherein the method further comprises:

rejecting the at least one rule when the at least one rule incorrectly identified the test field of one of the one or more training forms.

14. The system of claim 10, wherein the method further comprises:

detecting ambiguity in identification of the element of the first instance of the electronic form, wherein detecting the ambiguity comprises determining the identity of the element of the first instance of the electronic form to be ambiguous when a first predicted likelihood based on a first known pattern and a second predicted likelihood based on a second known pattern are within a threshold margin.

15. The system of claim 14, wherein the method further comprises:

determining a first normality score for the first known pattern;

determining a second normality score for the second known pattern; and resolving the ambiguity in favor of a greater of the first normality score and the second normality score.

16. The system of claim 10, wherein the autofill application is trained using a learning algorithm.

17. Computer-readable storage media storing instructions that, when executed by at least one processor, cause the at least one processor to perform a method, the method comprising:

identifying an element of a first instance of an electronic form;

determining a first value for the identified element of the first instance of the electronic form;

automatically filling the identified element of the first instance of the electronic form with the determined first value using an autofill application;

receiving first user input on the determined first value to produce a first corrected value for the identified element;

determining whether the first corrected value for the element is identifiable;

determining, when the first corrected value is identifiable, that the identified element was misidentified;

causing characteristics of the electronic form and a first data type of the first corrected value to be stored as a first training example in a training database;

identifying the element of a second instance of the electronic form;

determining a second value for the identified element of the second instance of the electronic form;

automatically filling the identified element of the second instance of the electronic form with the determined second value using the autofill application;

detecting that the second user is experiencing an issue with the second determined second value;

presenting, in response to detecting the issue, a user interface to correct the issue;

receiving, through the user interface, second user input on the determined second value to produce a second corrected value for the identified element, wherein the second user input explicitly identifies a second data type;

causing characteristics of the electronic form and the second data type of the second corrected value to be stored as a second training example in the training database; and training the autofill application using the first training example and the second training example, wherein the second training example is weighted differently from the first training example.

18. The computer-readable storage media of claim 17, wherein training the autofill application comprises training the autofill application using a learning algorithm.

19. The computer-readable storage media of claim 17, the method further comprising:

determining an ambiguity in identification of the element of the first instance of the electronic form;

determining a first normality score for a first known pattern associated with a first identity of the element of the first instance of the electronic form;

determining a second normality score for a second known pattern with a second identity of the element of the first instance of the electronic form; and resolving the ambiguity in favor of a greater of the first normality score and the second normality score.

20. The computer-readable storage media of claim 17, wherein training the autofill application comprises:

extracting a rule from one or more user corrections stored in the database;

testing the extracted rule on one or more training forms, wherein testing the extracted rule comprises determining whether the extracted rule correctly identified a test element of the one or more training forms; and incorporating the extracted rule in the autofill application when the rule correctly identified the test element of each of the one or more training forms.

* * * * *